(12) United States Patent
Hammer (10) Patent No.: US 9,630,581 B2
(45) Date of Patent: *Apr. 25, 2017

(54) VEHICLES WITH FENDER STRUCTURE ASSEMBLIES AND DEFORMING FENDER ATTACHMENT BRACKETS

(71) Applicant: Toyota Motor Engineering & Manufacturing North America, Inc., Erlanger, KY (US)

(72) Inventor: Jeremiah Thomas Hammer, Ann Arbor, MI (US)

(73) Assignee: Toyota Motor Engineering & Manufacturing North America, Inc., Erlanger ( * ) Notice: Subject to any disclaimer, the term of this patent is extended or adjusted under 35 U.S.C. 154(b) by 0 days.

This patent is subject to a terminal disclaimer.

(21) Appl. No.: 14/827,726

(22) Filed: Aug. 17, 2015

(65) Prior Publication Data

US 2017/0050597 A1 Feb. 23, 2017

(51) Int. Cl.
*B60R 21/34* (2011.01)
*B60R 19/34* (2006.01)
*G01B 21/02* (2006.01)

(52) U.S. Cl.
CPC .............. *B60R 19/34* (2013.01); *G01B 21/02* (2013.01)

(58) Field of Classification Search
CPC .... B60R 21/34; B60R 2021/343; B60R 19/12
USPC ...................................................... 296/187.04
See application file for complete search history.

(56) References Cited

U.S. PATENT DOCUMENTS

| 1,470,970 | A | 10/1923 | Groff |
| 3,528,530 | A | 9/1970 | Franck et al. |
| 4,190,276 | A | 2/1980 | Hirano et al. |
| 4,703,669 | A | 11/1987 | Hyodo |
| 5,096,223 | A | 3/1992 | Tekelly et al. |
| 5,314,229 | A | 5/1994 | Matuzawa et al. |

(Continued)

FOREIGN PATENT DOCUMENTS

| CN | 203651925 | 6/2014 |
| CN | 204150120 | 2/2015 |

(Continued)

*Primary Examiner* — Hilary Gutman
(74) *Attorney, Agent, or Firm* — Dinsmore & Shohl LLP (57) ABSTRACT

A vehicle includes a fender panel support assembly including a hood that at least partially covers an engine compartment. A front fender structure includes a connecting wall portion located at least partially below the hood in a vehicle vertical direction. A side structural member extends in a vehicle longitudinal direction. A deforming fender attachment bracket mounts the front fender structure to the side structural member. The deforming fender attachment bracket includes a fender attachment portion connected to the connecting wall portion of the front fender structure at a connecting location. A support leg is connected to the side structural member. The support leg extends toward the side structural member from a lateral edge of the fender attachment portion. The support leg has a width in a vehicle lateral direction that is defined by flexure and shear formulas in response to a target vehicle lateral force applied to the fender attachment portion. The support leg having increasing width from an apex portion connected to the fender attachment portion to a base portion removed from the fender attachment portion.

14 Claims, 10 Drawing Sheets

(56) References Cited

U.S. PATENT DOCUMENTS

| | | |
|---|---|---|
| 5,984,403 A | 11/1999 | Kuroda |
| 6,547,316 B2 | 4/2003 | Chung |
| 6,554,341 B2 | 4/2003 | Lee |
| 6,612,644 B2 | 9/2003 | Ahn |
| 6,676,197 B2 | 1/2004 | Ozawa |
| 6,698,820 B2 | 3/2004 | Nakata |
| 6,824,199 B2 | 11/2004 | Weik et al. |
| 6,926,349 B2 | 8/2005 | Cordebar et al. |
| 7,128,339 B2 | 10/2006 | Mani |
| 7,159,911 B2 | 1/2007 | Nguyen et al. |
| 7,204,545 B2 | 4/2007 | Roux et al. |
| 7,287,809 B2 | 10/2007 | Andre |
| 7,413,239 B2 | 8/2008 | Mitsuyama |
| 7,497,503 B2 | 3/2009 | Ito |
| 7,849,559 B2 | 12/2010 | Lindmark et al. |
| 8,182,027 B2 | 5/2012 | Steinhilb et al. |
| 8,944,495 B2 | 2/2015 | Tsuneyama et al. |
| 2004/0251716 A1 | 12/2004 | Choi et al. |
| 2006/0064845 A1 | 3/2006 | Fujii et al. |

FOREIGN PATENT DOCUMENTS

| | | |
|---|---|---|
| EP | 1749710 | 6/2010 |
| JP | 2001287669 | 10/2001 |
| JP | 2003118639 | 4/2003 |
| JP | 2006224800 | 8/2006 |
| JP | 4811327 | 11/2011 |
| JP | 5553819 | 7/2014 |

VEHICLES WITH FENDER STRUCTURE ASSEMBLIES AND DEFORMING FENDER ATTACHMENT BRACKETS

TECHNICAL FIELD

The present specification generally relates to fender structure assemblies for vehicles and, more specifically, to deforming fender attachment brackets for use in mounting fender structures to vehicles.

BACKGROUND

A number of countries have organizations that monitor safety performance of automobiles. For example, the European New Car Assessment Program (Euro NCAP) and the Japan New Car Assessment Program (JNCAP) provide rating schemes for crash testing automobiles. One area of interest relates to pedestrian head impacts, for example, along the front of the vehicle.

It is known that automobile bodies are typically formed of a number of panels that are mounted to support structures. One such panel is a fender structure, which is disposed on an apron structural member. Fender attachment brackets have been proposed for attaching the fender structure to an apron structural member and function to absorb impact energy.

SUMMARY

In one embodiment, a vehicle includes a fender panel support assembly including a hood that at least partially covers an engine compartment. A front fender structure includes a connecting wall portion located at least partially below the hood in a vehicle vertical direction. A side structural member extends in a vehicle longitudinal direction. A deforming fender attachment bracket mounts the front fender structure to the side structural member. The deforming fender attachment bracket includes a fender attachment portion connected to the connecting wall portion of the front fender structure at a connecting location. A support leg is connected to the side structural member. The support leg extends toward the side structural member from a lateral edge of the fender attachment portion. The support leg has a width in a vehicle lateral direction that is defined by flexure and shear formulas in response to a target vehicle lateral force applied to the fender attachment portion. The support leg having increasing width from an apex portion connected to the fender attachment portion to a base portion removed from the fender attachment portion.

In another embodiment, a method of forming a deforming fender attachment bracket that mounts a front fender structure to a side structural member of a vehicle is provided. The method includes determining a minimum width of a support leg of the deforming fender attachment bracket using flexure and shear formulas in response to a target vehicle lateral force applied to a fender attachment portion of the deforming fender attachment bracket. The deforming fender attachment bracket includes the fender attachment portion configured to connect to the front fender structure at a connecting location and the support leg configured to connect to the side structural member. The minimum width of the support leg is used to provide the deforming fender attachment bracket.

In another embodiment, a vehicle including a fender panel support assembly includes a hood that at least partially covers an engine compartment. A front fender structure includes a connecting wall portion located at least partially below the hood in a vehicle vertical direction. A side structural member extends in a vehicle longitudinal direction. A deforming fender attachment bracket mounts the front fender structure to the side structural member. The deforming fender attachment bracket includes a fender attachment portion connected to the connecting wall portion of the front fender structure at a connecting location. A support leg is connected to the side structural member. The support leg extends toward the side structural member from a lateral edge of the fender attachment portion. The support leg increases in width from an apex portion connected to the fender attachment portion to a base portion removed from the fender attachment portion. A width of the base portion is at least 1.5 times a width of the apex portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to deforming fender attachment brackets for use in mounting fenders to vehicles. The deforming fender attachment brackets include a fender attachment portion that attaches to a fender structure and support legs that extend outwardly from the fender attachment portion that attach to a support structure. While the deforming fender attachment bracket may deform in a predictable fashion in response to a force applied to the fender structure in a vehicle vertical direction, it is also desirable to provide some feeling of stiffness of the fender structure under normal contact conditions. The deforming fender attachment brackets described herein can provide a level of subjective stiffness, particularly in a vehicle lateral direction, while providing a tapered leg structure that can reduce dimensions of the deforming fender attachment brackets.

Figure 1:
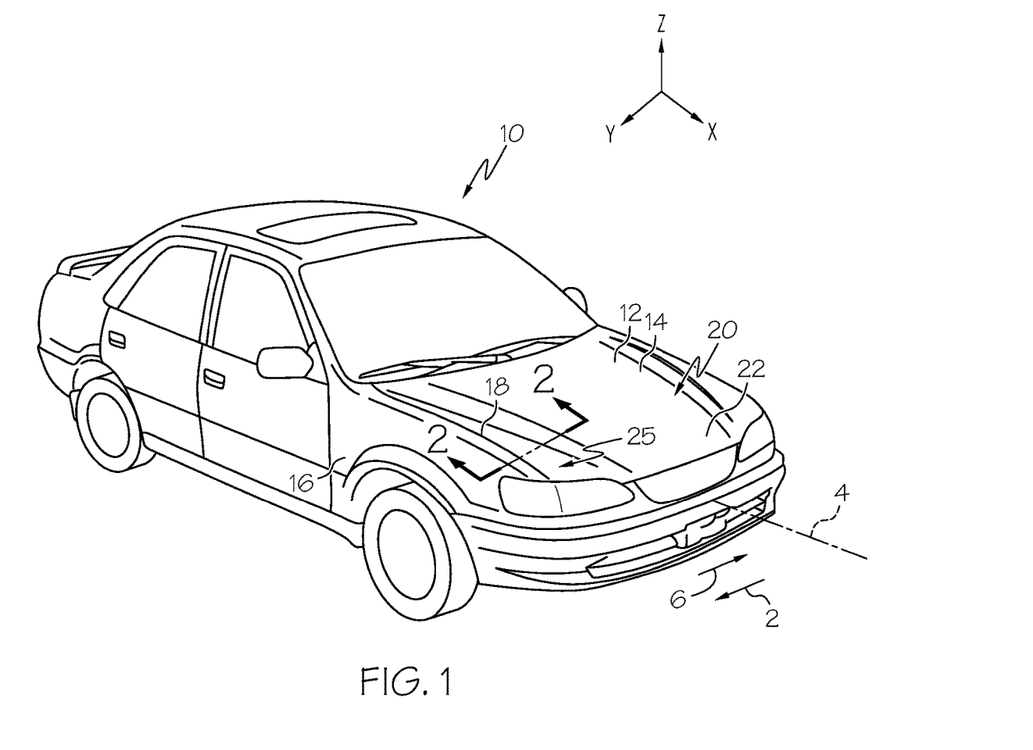
FIG. 1 is a perspective view of a motor vehicle according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

Figure 2:
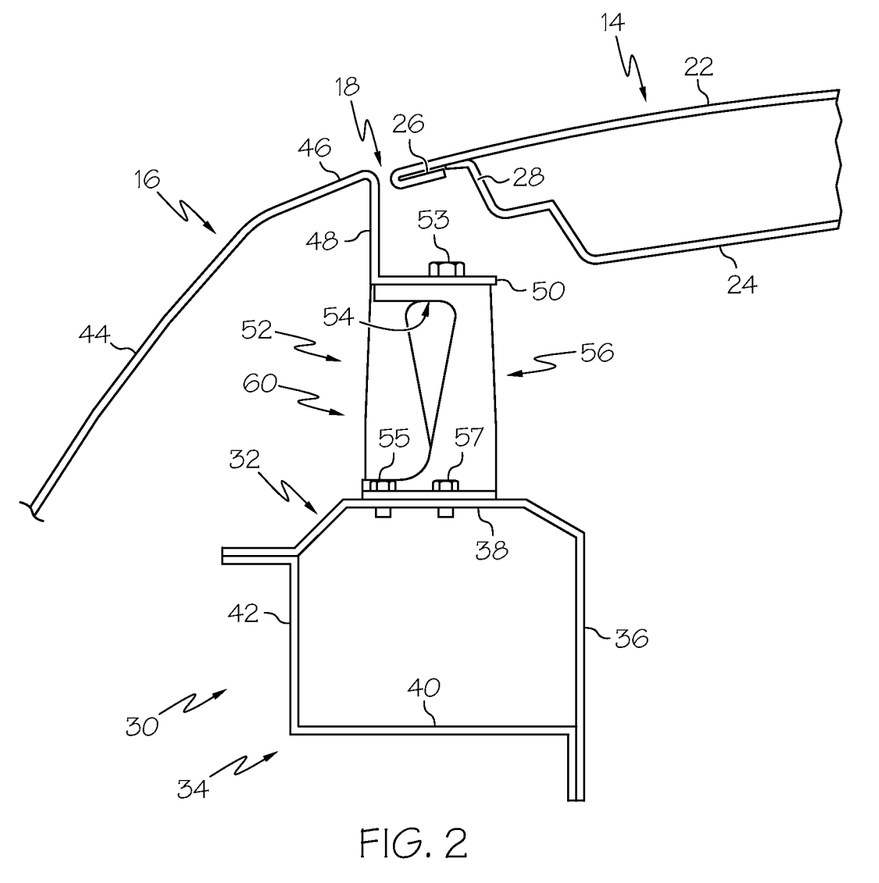
FIG. 2 is a diagrammatic section view along lines 2-2 of FIG. 1 illustrating an embodiment of a fender structure according to one or more embodiments shown and described herein.

The vehicle 10 includes a vehicle body 12 with a hood 14, a front fender structure 16 and a boundary line 18 running along the length of the vehicle 10 between the hood 14 and the front fender structure 16. The hood 14 (which may be formed of a metal material) is generally disposed above an engine compartment 20 so as to be able to open the hood 14 to gain access to the engine compartment 20. The hood 14 may be formed of multiple panels, such as an outer hood panel 22 and an inner hood panel 24 (FIG. 2). The front fender structure 16, which may be formed of a metal or plastic material, is located to an outboard side of the outer hood panel 22. As will be described in greater detail below, the front fender structure 16 is attached to a side or apron structural member by a deforming fender attachment bracket forming a fender panel support assembly generally designated element 25 that is positioned along the length of the vehicle 10.

Referring to FIG. 2, the inner hood panel 24 is located on a lower side of the outer hood panel 22. The inner hood panel 24 may be attached to the outer hood panel 22 such that an outer edge portion 26 of the outer hood panel 22 is fixed by hemming to an outer flange 28 of the inner hood panel 24 that projects outward in the vehicle lateral direction. Any other suitable connection structure may be used to connect the inner and outer hood panels 24 and 22.

A side or apron structural member 30 is located below the boundary line 18 between the hood 14 and the front fender structure 16. The apron structural member 30 extends generally in the lengthwise direction of the vehicle 10 with the boundary line 18. The apron structural member 30 includes an upper apron member 32 and a lower apron member 34. The upper apron member 32 includes a vertical portion 36 that is connected to a horizontal portion 38 forming a somewhat L-shaped section as viewed in the lengthwise direction of the vehicle 10. It should be noted that the term "vertical" means to extend generally in a vertical direction and is not meant to exclude one or more horizontally extending components. Similarly, the term "horizontal" means to extend generally in a horizontal direction and is not meant to exclude one or more vertically extending components. The lower apron member 34 includes a horizontal portion 40 connected to a vertical portion 42 forming a somewhat L-shaped section as viewed in the lengthwise direction of the vehicle 10. The upper and lower apron members 32 and 34 may be connected in any suitable manner such as by fasteners, welding, etc. In some embodiments, the upper apron member 32 and the lower apron member 34 cooperate to form a closed space or area that extends in the lengthwise direction of the vehicle 10. Other configurations are possible for the apron structural member 30, such as a U-shaped upper member that is connected to an L-shaped lower member.

Figure 3:
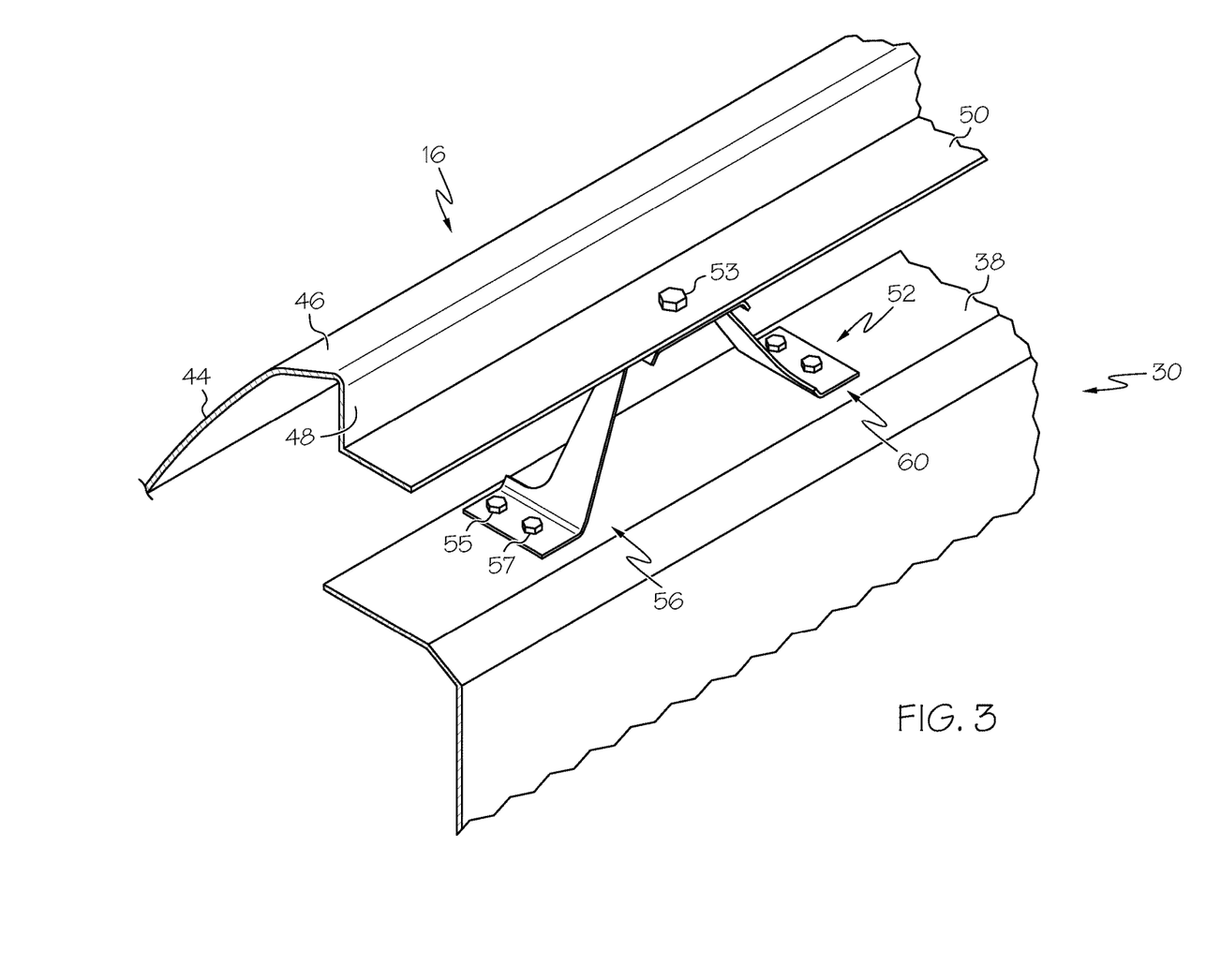
FIG. 3 is a perspective view of the fender structure of FIG. 2.

Referring to FIGS. 2 and 3, the front fender structure 16 includes an outer wall 44 that extends downward from a top end portion 46 of the outer wall 44 toward a front wheel of the vehicle 10. An inner wall 48 extends downwardly from the top end portion 46 at the boundary line 18 to a connecting wall portion 50 disposed at least partially below the hood 14.

A deforming fender attachment bracket 52 connects the front fender structure 16 at the connecting wall portion 50 to the upper apron member 32 at the horizontal portion 38. A fastener 53 may connect the deforming fender attachment bracket 52 to the connecting wall portion 50 and fasteners 55 and 57 may connect the deforming fender attachment bracket 52 to the upper apron member 32. In other embodiments, welds may connect the deforming fender attachment bracket 52 to the upper apron member 32, for example, instead of fasteners 55 and 57. The deforming fender attachment bracket 52 includes a fender attachment portion 54 that attaches to the connecting wall portion 50 of the front fender structure 16. As will be described in greater detail below, support legs 56 and 60 are provided that both allow for deformation of the fender attachment bracket 52 in response to application of impact forces in the vehicle vertical direction, while also provided some subjective stiffness for the front fender structure 16, particularly in the vehicle lateral direction.

Figure 4A:
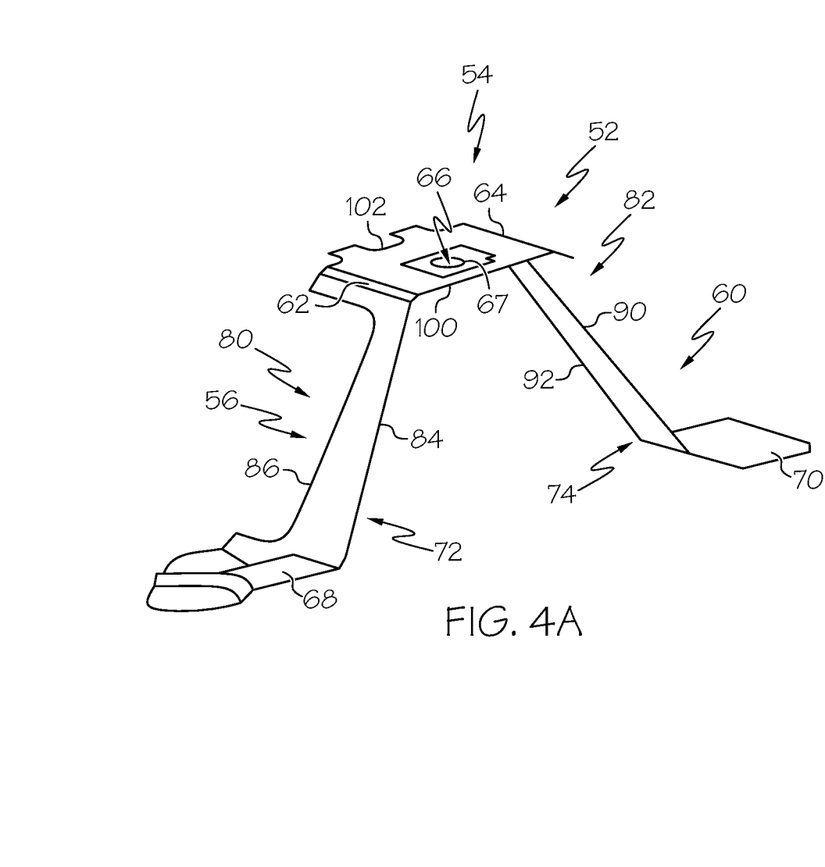
FIG. 4A is a perspective view of an embodiment of a deforming fender attachment bracket for use in the fender structure of FIG. 2 according to one or more embodiments shown and described herein.
Figure 4B:
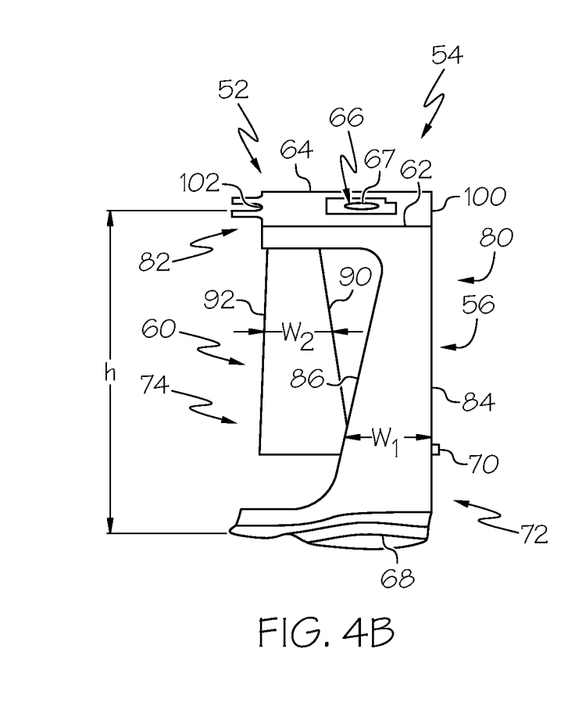
FIG. 4B is a side view of a side view of the deforming fender attachment bracket of FIG. 4A.

Referring to FIGS. 4A and 4B, the deforming fender attachment bracket 52 is illustrated in isolation and includes the fender attachment portion 54 and the support legs 56 and 60 that extend outwardly from the fender attachment portion 54 at opposite lateral edges 62 and 64, respectively, of the fender attachment portion 54. The fender attachment portion 54 extends between the support legs 56 and 60 and includes a connecting structure 66 in the form of an opening 67 that connects to the connecting wall portion 50 of the front fender structure 16. A foot 68 and 70 is illustrated as extending outwardly from the support legs 56 and 60, spaced away from the fender attachment portion 54 at base portions 72 and 74 of each support leg 56 and 60. The feet 68 and 70 may be used to connect the deforming fender attachment bracket 52 to the upper apron member 32. The feet 68 and 70 may include openings (see FIG. 3) through which the fasteners 55 and 57 may be inserted. In other embodiments, fasteners 55 and 57 may not be used to connect the feet 68 and 70 to the upper apron member 32. For example, the feet 68 and 70 may be welded to the upper apron member 32.

The support leg 56 includes the base portion 72 that is connected to the foot 68 and an apex portion 80 that is connected to the lateral edge 62 of the fender attachment portion 54. The support leg 56 includes an inner side 84 and an outer side 86. In the illustrated example, the outer side 86 extends from the base portion 72 in a direction toward the inner side 84 thereby providing a tapered width $W_1$ as the support leg 56 extends from the base portion 74 toward the apex portion 80. Likewise, the support leg 60 includes the base portion 74 and an apex portion 82 that is connected to the lateral edge 64 of the fender attachment portion 54. The support leg 60 includes an inner side 90 and an outer side 92. In the illustrated example, the inner side 90 extends from the base portion 74 in a direction toward the outer side 92 thereby providing a tapered width $W_2$ as the support leg 60 extends from the base portion 74 toward the apex portion 82.

The widths of the support legs 56 and 60 at their base portions 72 and 74 are greater than the widths of the support legs 56 and 60 at their apex portions 80 and 82. In some embodiments, the support legs may have a width at their base portions 72 and 74 that is a least 1.5 times (e.g., at least 2 times, at least 2.5 times, at least 3 times) a width of the support legs 56 and 60 at their apex portions 80 and 82.

The fender attachment portion 54 is somewhat of a platform-shape that is connected to the apex portions 80 and 82 of the support legs 56 and 60. The fender attachment portion 54 includes an inner edge 100, an outer edge 102 and the opposite lateral edges 62 and 64 that extend therebetween. In the illustrated example, the apex portion 80 of the support leg 56 may extend from the inner edge 100, toward the outer edge 102 and terminate at an outer location that is located inboard (or spaced-away in the widthwise direction) from the outer edge 102. The apex portion 82 may extend from the outer edge 102, toward the inner edge 100 and terminate at an inner location that is located outboard (or spaced-away in the widthwise direction) from the inner edge 100.

Without wishing to be bound by theory, head impact tests to the hood and fender areas of a vehicle illustrate a need for providing relatively soft impacts (or controlled headform deceleration). The use of the deforming fender attachment bracket 52 can deform in a controlled, predictable manner that provides for controlled headform deceleration. However, there are other design factors, such as subjective stiffness of the front fender structure 16 in the vehicle lateral direction. The deforming fender attachment brackets described herein can also provide lateral subjective stiffness, for example, when a user applies a lateral force against the front fender structure 16 by providing the support legs with a calculated minimum width at their base portions. As will be described in greater detail below, due to the way the stress forms from a lateral target force against the fender attachment portion 54, the base portions of the support legs need to be wider than the apex portions, which are closest to the applied lateral force on the front fender structure. The shape of the support legs can be determined based on flexural and shear formulas.

Figure 5A:
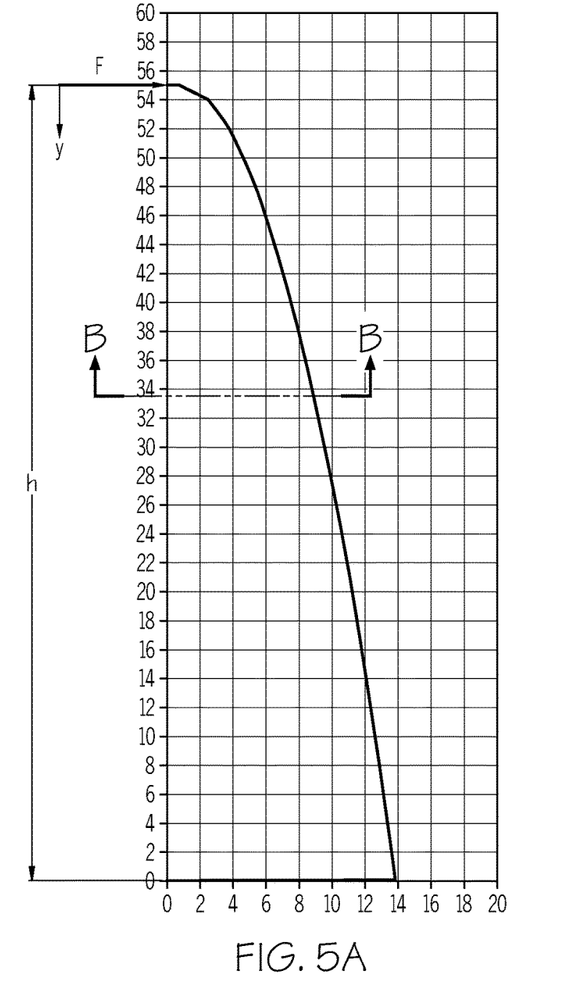
FIG. 5A illustrates an exemplary curve determined for a minimum width of a support leg using flexure and shear formulas in response to a target vehicle lateral force.
Figure 5B:
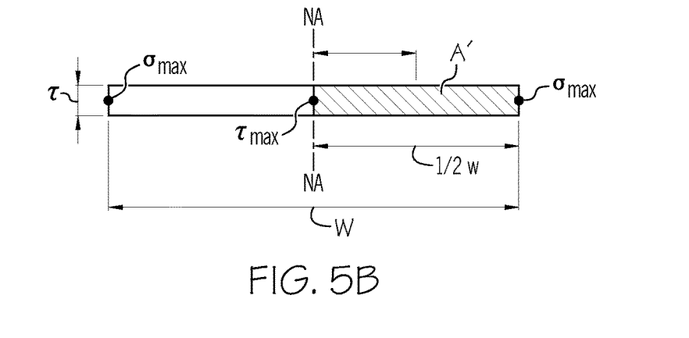
FIG. 5B illustrates a section of a support leg along line B-B of FIG. 5A.

Referring to FIGS. 5A and 5B, during lateral loading, the bending moment imparted to a deforming fender attachment bracket is defined by the applied force F and the height of the bracket itself and is given by:

$$M = Fy$$

where, F is the applied force and y is the height of the width section from the applied force. Since the moment is a function of the height, each increment of height is experiencing a different moment value. The farther away from the force along the height of the support leg, the greater the moment experienced by the support leg of the deforming attachment bracket. The applied force F is a predetermined target force that can be selected based on the subjective stiffness targets.

Stress in the support leg when loaded in the manner of FIGS. 5A and 5B is developed by both bending and shear stresses. Bending stress is defined by the flexure formula and is given by:

$$\sigma_{bending} = \frac{Mc}{I}$$

where, c is the perpendicular distance from the neutral axis (NA) to a point farthest away from the neutral axis (where $\sigma_{max}$ acts). Here, c is given by:

$$c = \frac{1}{2}w$$

and I is the moment of inertia of the support leg, in this case for a rectangle, and given by:

$$I = \frac{1}{12}tw^3$$

where, t is the thickness of the support leg and w is the width of the support leg. Combining the above equations gives:

$$\sigma_{bending} = \frac{Mc}{I} = \frac{Fyc}{I} = \frac{Fy\left(\frac{1}{2}\right)w}{\left(\frac{1}{12}\right)tw^3} = \frac{6Fy}{tw^2}.$$

Shear stress is defined by the shear formula and is given by:

$$\tau_{shear} = \frac{VQ}{It}$$

where, V is the resultant shear force and, in this case, described as V=F. Q is the portion of the member's cross-sectional area as defined where t is measured and y' is the distance to the centroid of A', measured from the neutral axis. In this case, Q is given by:

$$Q = y'A' = \left(\frac{1}{4}w\right)\left(\frac{1}{2}tw\right),$$

and
t is the width of the support leg cross-sectional area, measured at the point where τ is to be determined. Here, the maximum shear is across the neutral axis (NA). The shear formula now becomes:

$$\tau_{shear} = \frac{VQ}{It} = \frac{F\left(\frac{1}{4}w\right)\left(\frac{1}{2}tw\right)}{\left(\frac{1}{12}\right)tw^3 t} = \frac{3Ftw^2}{2t^2w^3} = \frac{3F}{2tw}.$$

From the equations above, the minimum support leg width can be calculated from known data. The required width of the support leg can be found for the bending stresses:

$$w_{bending} = \sqrt{\frac{6Fy}{\sigma_{bending}t}}.$$

The required width of the support leg can be found for the shear stresses:

$$w_{shear} = \frac{3F}{2t\tau_{shear}}.$$

The total required width of the support leg is determined by the sum of the two equations above. The bending and shear stresses can be defined by the yield strength of the material utilized. Using the material yield strength gives the minimum width of the support leg before bending will occur.

$$w_{total} = \frac{3F}{2t\tau_{shear}} + \sqrt{\frac{6F(h-y)}{\sigma_{bending}t}}$$

It can be seen that the required cross-section is a function of the distance from the applied force. This implies that the farther a cross-section is from the applied force, the larger that cross section will need to be to maintain the desired strength.

Figure 6:
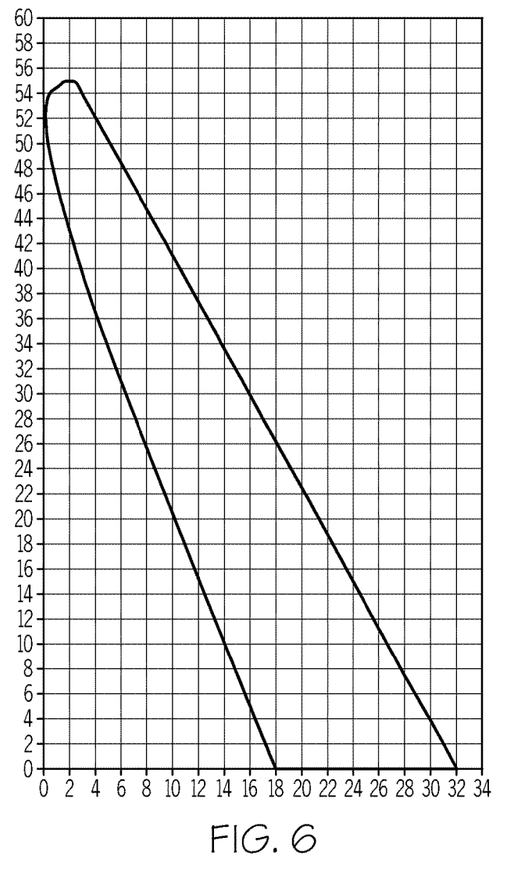
FIGS. 6 and 7 illustrate additional curves determined for a minimum width of a support leg using flexure and shear formulas in response to a target vehicle lateral force.
Figure 7:
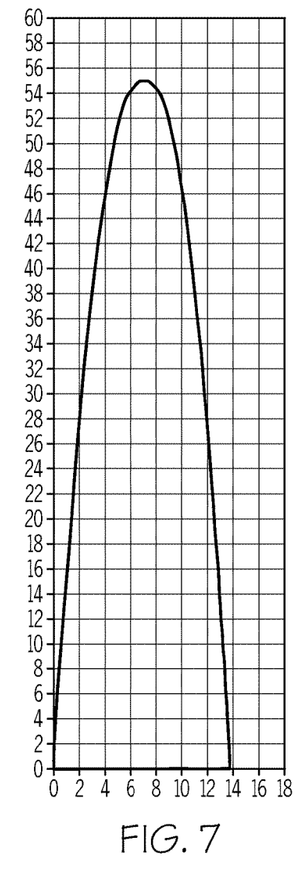

FIG. 5A illustrates an exemplary curve of a support leg for known thickness (t), material yield strength (σ, τ), height (h) and target force (F). The illustrated curve is for a support leg of 55 mm in height and 0.7 mm in thickness. The height h of the support leg may be measured perpendicular to the support surface to the fender attachment portion (see FIG. 4B). However, other heights may be used, depending, for example, on space constraints. For example, the height may be at least about 30 mm, such as at least about 40 mm, such as at least about 50 mm or higher. As can be see, the curve is nonlinear with y, resulting in a minimum width of the base portion of about 14 mm for a pre-selected lateral target force F. The base portion may be defined as the lower half of the support leg. It should be noted that the curve need not be set to a vertical (against the y-axis), but a variety of shapes may be used that meet the minimum calculated width. FIGS. 6 and 7 illustrate additional examples.

Figure 8:
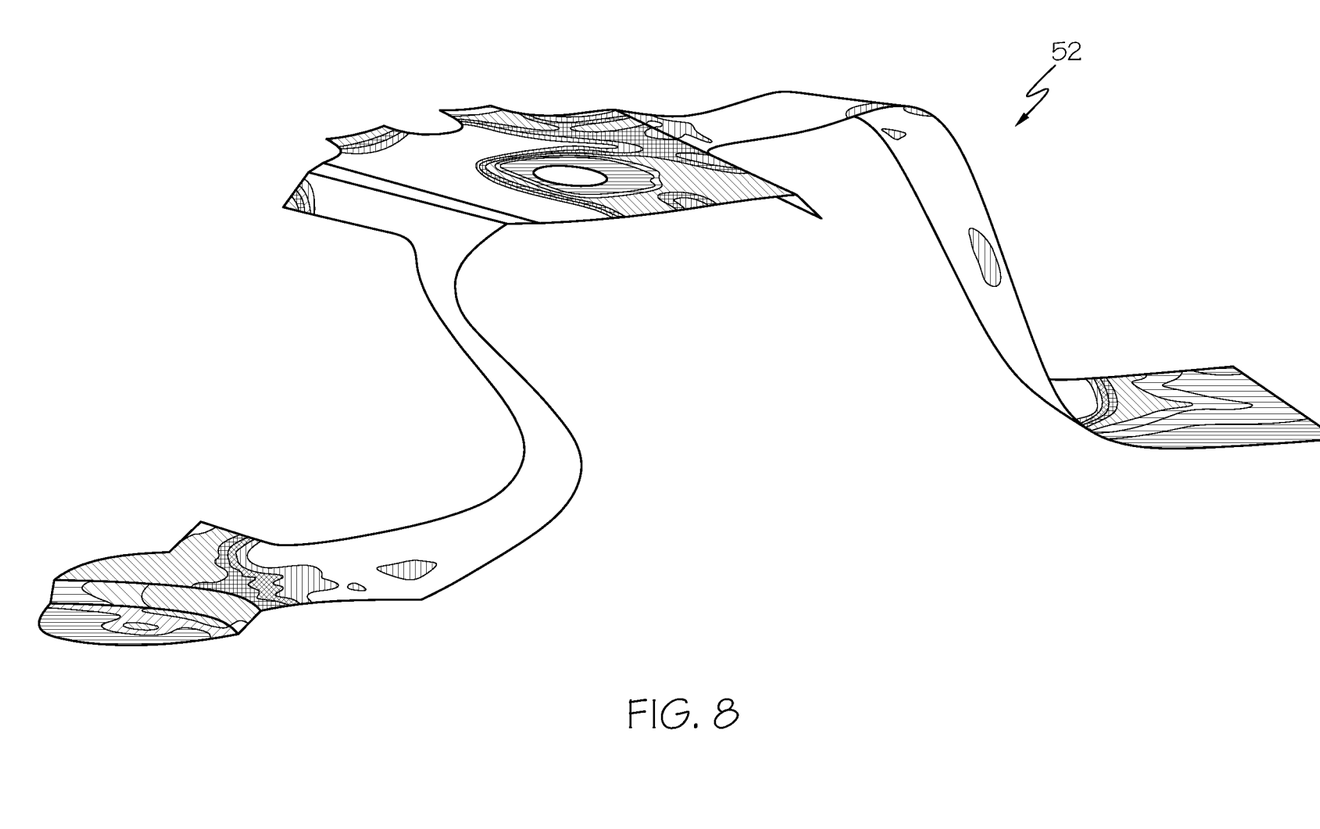
FIG. 8 is a diagrammatic section view of the deforming fender attachment bracket of FIG. 4A in a deformed configuration according to one or more embodiments shown and described herein.

Referring to FIG. 8, the deforming fender attachment bracket 52 is shown in a buckled configuration due to a force applied in the vehicle vertical direction. While the deforming fender attachment bracket 52 provides some subjective stiffness in both the vehicle lateral and vertical directions, the deforming fender attachment bracket 52 also allows for vertical bracket displacement and lower head acceleration which can lower head injury values (HIC).

Figure 9A:
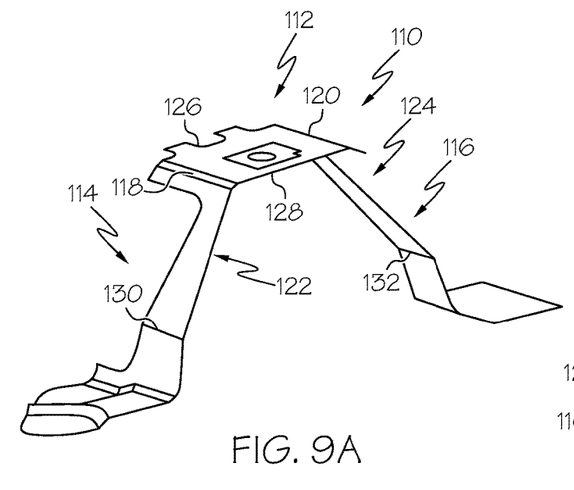
FIG. 9A is a perspective view of another embodiment of a deforming fender attachment bracket according to one or more embodiments shown and described herein.
Figure 9B:
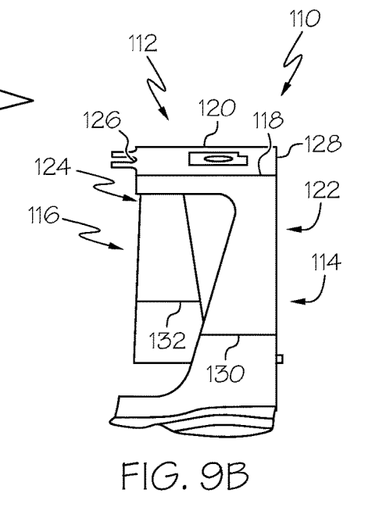
FIG. 9B is a side view of the deforming fender attachment bracket of FIG. 9A.

Referring to FIGS. 9A and 9B, another embodiment of a deforming fender attachment bracket 110 includes many of the features described above including a fender attachment portion 112 and support legs 114 and 116 extending outwardly from opposite lateral edges 118 and 120 of the fender attachment portion 112. As can be seen, the support legs 114 and 116 have apex portions 122 and 124 that are located at opposite outer and inner edges 126 and 128 of the fender attachment portion 112. In this embodiment, however, one or both of the support legs 114 and 116 include at least one bend 130 and 132, dividing the support legs 114 and 116 into upper and lower portions 125 and 127. Providing such a bend 130, 132 can further increase buckling of the support legs 114 and 116 during an impact.

Figure 10A:
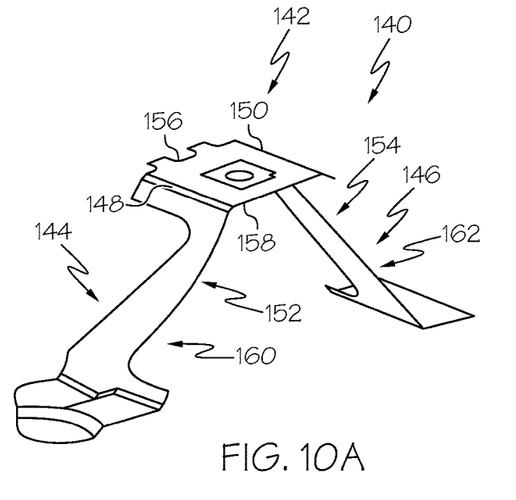
FIG. 10A is a perspective view of another embodiment of a deforming fender attachment bracket according to one or more embodiments shown and described herein.
Figure 10B:
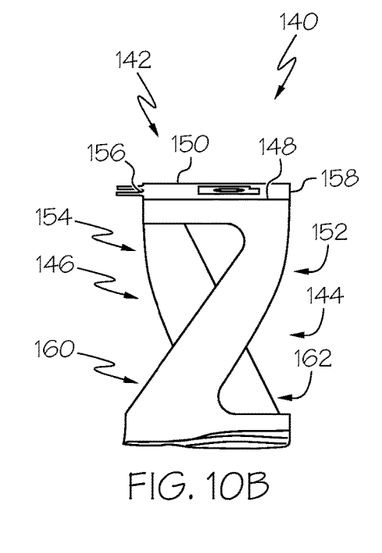
FIG. 10B is a side view of the deforming fender attachment bracket of FIG. 10A.

Referring to FIGS. 10A and 10B, another embodiment of a deforming fender bracket 140 includes many of the features described above including a fender attachment portion 142 and support legs 144 and 146 extending outwardly from opposite lateral edges 148 and 150 of the fender attachment portion 142. As can be seen, the support legs 144 and 146 have apex portions 152 and 154 that are located at opposite outer and inner edges 156 and 158 of the fender attachment portion 142. The support legs 144 and 146 of this embodiment generally correspond to the curve shown by FIG. 6 where the apex portions 154 and 154 are offset in the vehicle lateral direction from base portions 160 and 162, forming a somewhat Z-shape for the overall bracket structure.

Figure 11A:
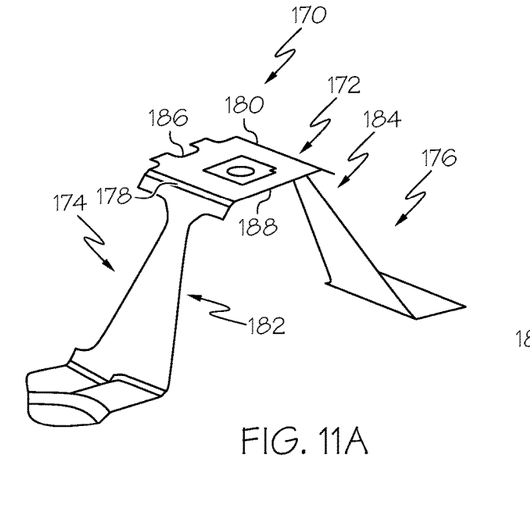
FIG. 11A is a perspective view of another embodiment of a deforming fender attachment bracket according to one or more embodiments shown and described herein.
Figure 11B:
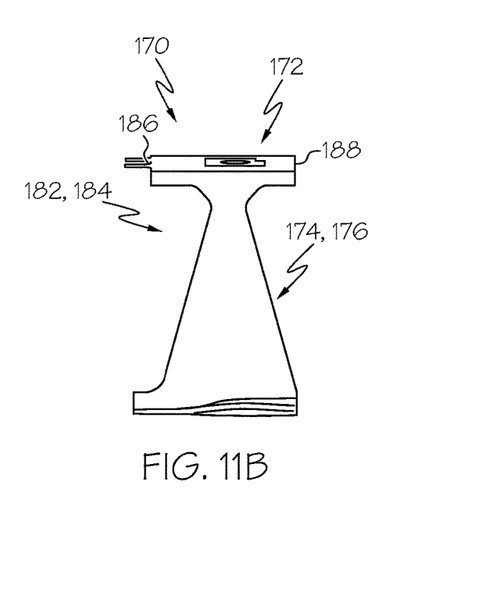
FIG. 11B is a side view of the offset deforming fender attachment bracket of FIG. 11A.

Referring to FIGS. 11A and 11B, another embodiment of a deforming fender bracket 170 includes many of the features described above including a fender attachment portion 172 and support legs 174 and 176 extending outwardly from opposite lateral edges 178 and 180 of the fender attachment portion 172. As can be seen, the support legs 174 and 176 have apex portions 182 and 184 that are centrally located between opposite outer and inner edges 186 and 188 of the fender attachment portion 172. This embodiment generally corresponds to the curve shown by FIG. 7 where the apex portions 154 and 154 are centrally located between the outer and inner edges 186 and 188 on the lateral edges 178 and 180.

Figure 12A:
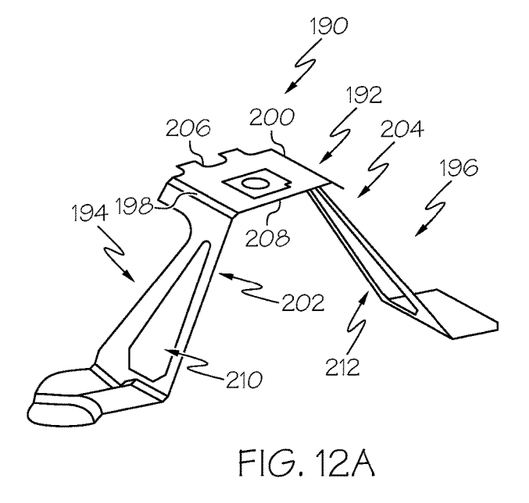
FIG. 12A is a perspective view of another embodiment of a deforming fender attachment bracket according to one or more embodiments shown and described herein.
Figure 12B:
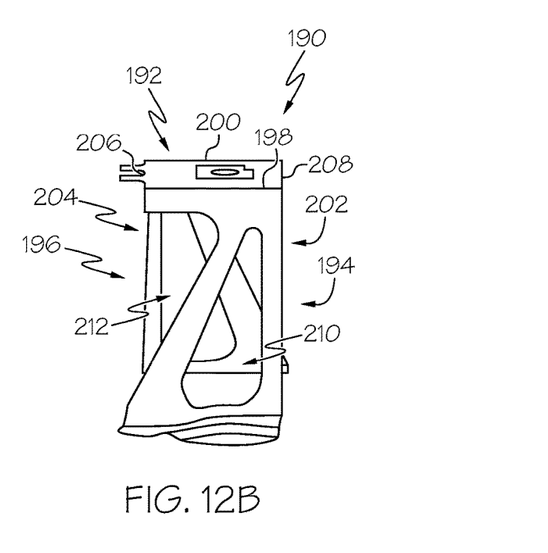
FIG. 12B is a side view of the offset deforming fender attachment bracket of FIG. 12A.

Referring to FIGS. 12A and 12B, another embodiment of a deforming fender bracket 190 includes many of the features described above including a fender attachment portion 192 and support legs 194 and 196 extending outwardly from opposite lateral edges 198 and 200 of the fender attachment portion 192. As can be seen, the support legs 194 and 196 have apex portions 202 and 204 that are located at opposite outer and inner edges 206 and 208 of the fender attachment portion 192. Unlike the embodiments described above, the support legs 194 and 196 includes openings 210 and 212 extending therethrough. While the openings 210 and 212 are present, the shape of the support legs 194 and 196 is determined using the shear and flexure formulas described above. However, given the complexity of loading, a computer-aided engineering (CAE) software tool may be used to determine minimum width of the support legs 194 and 196.

Figure 13:
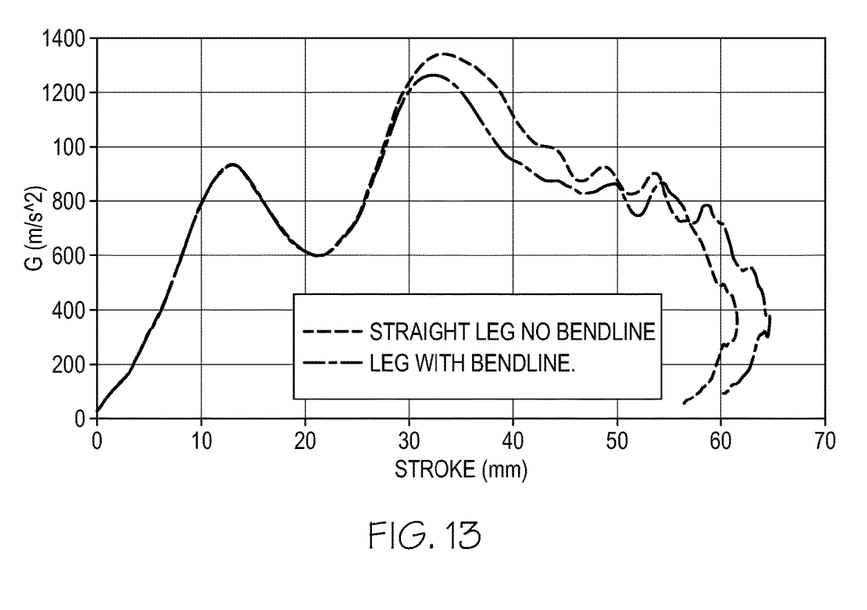
FIG. 13 is a graph of acceleration versus displacement for the pedestrian impact test using a deforming fender attachment bracket according to one or more embodiments shown and described herein.

The above-described deforming fender attachment brackets can allow for greater vertical bracket displacement and lower head acceleration which can lower head injury values (HIC). Referring to FIG. 13, a graph of acceleration versus stroke is shown for a deforming attachment bracket with bend (e.g., FIG. 9A) compared to an attachment bracket with straight support legs and no bend (e.g., FIG. 4A). The graph of FIG. 13 may be generated using data collected from any suitable testing procedure, such as JNCAP, Euro NCAP or Global Technical Regulation (GTR) No. 9 testing procedures for pedestrians. As can be seen, the deforming attachment brackets with bends can give more displacement than the attachment bracket without bends depending on the desired end result.

The above deforming fender attachment brackets may be formed of any suitable material such as a metal material (e.g., steel). Any suitable process or combination of processes may be used to form the deforming attachment brackets such as bending, stamping, machining, etc. In some embodiments, the minimum width of the support leg may be determined (e.g., manually or using a CAE software program) and then provided to a manufacturer for producing the deforming fender attachment brackets, or the minimum width may be determined and then provided internally to manufacture the deforming fender attachment brackets. Additionally, while pairs of support legs are shown and described above, the deforming fender attachment brackets may include only one or more than two support legs.

The above-described deforming fender attachment brackets provide an attachment structure that may be used to absorb impact energy during a front collision. The deforming fender attachment brackets may provide for The deforming fender attachment brackets can also provide subjective lateral rigidity of the front fender structures for users. While the above deforming attachment brackets are described in the context of fender panels, the deforming attachment brackets may be used with other vehicle panels.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle including a fender panel support assembly, comprising:
    a hood that at least partially covers an engine compartment;
    a front fender structure comprising a connecting wall portion located at least partially below the hood in a vehicle vertical direction;
    a side structural member that extends in a vehicle longitudinal direction; and
    a deforming fender attachment bracket that mounts the front fender structure to the side structural member, the deforming fender attachment bracket comprising:
        a fender attachment portion connected to the connecting wall portion of the front fender structure at a connecting location;
        a first support leg connected to the side structural member, the first support leg extending toward the side structural member from a lateral edge of the fender attachment portion, the first support leg having increasing width from an apex portion connected to the fender attachment portion to a base portion removed from the fender attachment portion; and
        a second support leg connected to the side structural member, the second support leg extending toward the structural member from an opposite lateral edge of the fender attachment portion, the apex portion of the first support leg is located nearer to an inner edge of the fender attachment portion than an apex portion of the second support leg.

2. The vehicle of claim 1, wherein the first support leg of the deforming fender attachment bracket includes an inner side that extends from a base portion of the first support leg to the apex portion and an outer side that extends from the base portion of the first support leg to the apex portion.

3. The vehicle of claim 2, wherein the inner side extends toward the outer side thereby providing the first support leg with the width that tapers from the base portion to the apex portion.

4. The vehicle of claim 2, wherein the outer side extends toward the inner side thereby providing the first support leg with the width that tapers from the base portion to the apex portion.

5. The vehicle of claim 1, wherein the second support leg having increasing width from the apex portion connected to the fender attachment portion to a base portion removed from the fender attachment portion.

6. The vehicle of claim 5, wherein the second support leg of the deforming fender attachment bracket includes an inner side that extends from a base portion of the second support leg to the apex portion and an outer side that extends from the base portion of the second support leg to the apex portion.

7. The vehicle of claim 6, wherein the inner side of the second support leg extends toward the outer side of the second support leg thereby providing the second support leg with the width that tapers from the base portion of the second support leg to the apex portion of the second support leg.

8. The vehicle of claim 6, wherein the outer side of the second support leg extends toward the inner side of the second support leg thereby providing the second support leg with the width that tapers from the base portion of the second support leg to the apex portion of the second support leg.

9. The vehicle of claim 1, wherein the apex portion of the second support leg is located nearer to an outer edge of the fender attachment portion than the apex portion of the first support leg.

10. A vehicle including a fender panel support assembly, comprising:
    a hood that at least partially covers an engine compartment;
    a front fender structure comprising a connecting wall portion located at least partially below the hood in a vehicle vertical direction;
    a side structural member that extends in a vehicle longitudinal direction; and a deforming fender attachment bracket that mounts the front fender structure to the side structural member, the deforming fender attachment bracket comprising:

a fender attachment portion connected to the connecting wall portion of the front fender structure at a connecting location;

a first support leg connected to the side structural member, the first support leg extending toward the side structural member from a lateral edge of the fender attachment portion, the first support leg increasing in width from an apex portion connected to the fender attachment portion to a base portion removed from the fender attachment portion;

wherein a width of the base portion is at least 1.5 times a width of the apex portion; and a second support leg connected to the side structural member, the second support leg extending toward the side structural member from an opposite lateral edge of the fender attachment portion, the apex portion of the first support leg is located nearer to an inner edge of the fender attachment portion than an apex portion of the second support leg.

11. The vehicle of claim 10, wherein a height of the deforming fender support bracket is at least about 30 mm.

12. The vehicle of claim 11, wherein the width of the base portion is at least about 7 mm.

13. The vehicle of claim 10, wherein the second support leg increasing in width from the apex portion connected to the fender attachment portion to a base portion removed from the fender attachment portion, wherein a width of the base portion of the second support leg is at least 1.5 times a width of the apex portion of the second support leg.

14. The vehicle of claim 10, wherein the first support leg includes a bend that separates the first support leg into the base portion and the apex portion.

* * * * *